W. N. KLOTZ.
SHEET METAL DRAIN PIPE.
APPLICATION FILED SEPT. 4, 1908.
1,075,153.
Patented Oct. 7, 1913.
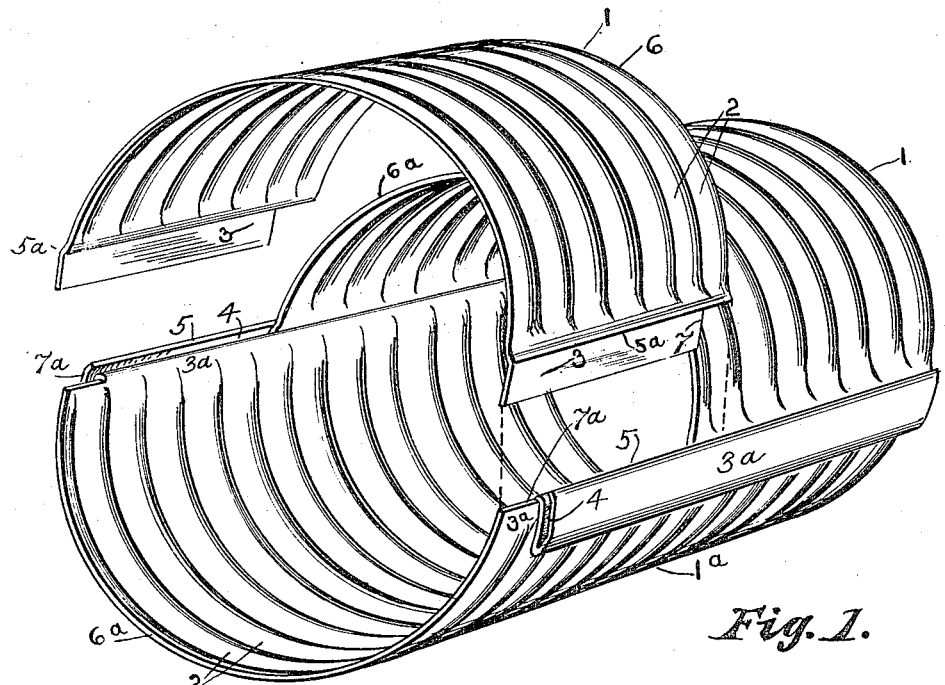
Fig. 1.
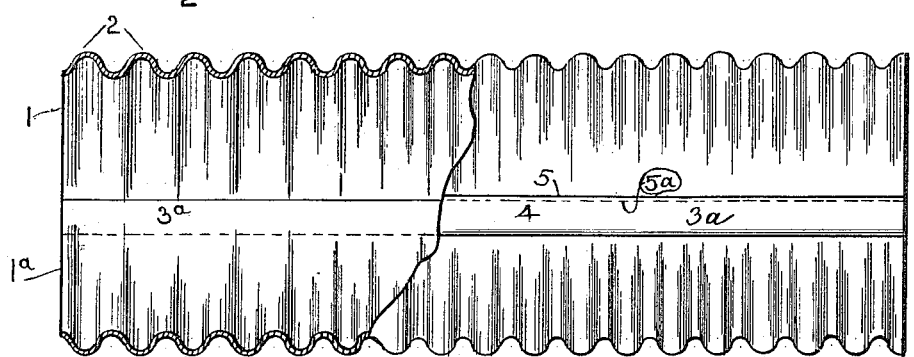
Fig. 2.
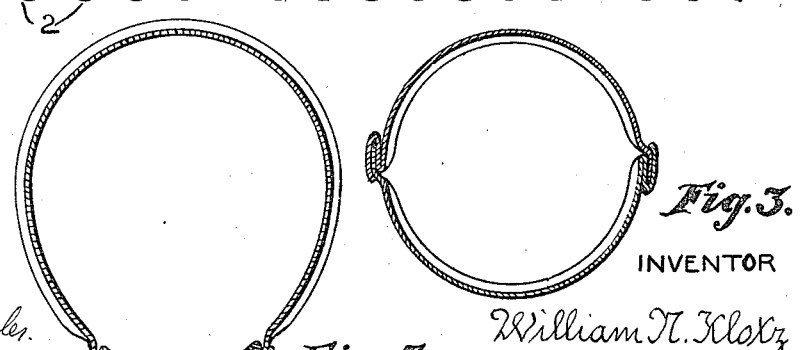
Fig. 3.
Fig. 4.
WITNESSES
Joseph J. Hosler.
Edwin F. Frease
INVENTOR
William N. Klotz,
BY
Harry Frease
ATTORNEY

UNITED STATES PATENT OFFICE.

WILLIAM N. KLOTZ, OF CANTON, OHIO, ASSIGNOR TO THE CANTON CULVERT COMPANY, OF CANTON, OHIO, A CORPORATION OF OHIO.

SHEET-METAL DRAIN-PIPE.

1,075,153.  Specification of Letters Patent.  Patented Oct. 7, 1913.

Application filed September 4, 1908. Serial No. 451,655.

*To all whom it may concern:*

Be it known that I, WILLIAM N. KLOTZ, a citizen of the United States, residing at Canton, in the county of Stark and State of Ohio, have invented a new and useful Improvement in Sheet-Metal Drain-Pipes, of which the following is a specification.

The invention relates to drain pipes made of sheet metal, preferably galvanized sheet iron or steel, which same are usually made with annular corrugations to increase the strength of the sheet metal. Such pipes are frequently made of semi-circular sections which are adapted to be nested together for shipment, and to be assembled to form a pipe at the place of use by joining together the side and end edges of the respective sections; and the object of the present invention is to provide a tight and secure joint between the side edges of the sections, whereby the sections can be assembled to form a pipe without the use of bolts or other auxiliary connecting or securing devices. This object is attained by forming the side edges of the sections straight or flat and by folding one opposing edge twice upon itself to form a longitudinal groove in which the other edge is adapted to be entered and clamped, which slip joint holds the edges securely together while the pipe is being formed, and when the pipe is covered the edges thus joined cannot be separated.

The invention, thus set forth in general terms, is illustrated in the accompanying drawings, forming part hereof, in which—

Figure 1 is a perspective view of the improved pipe showing one section slightly separated from the others; Fig. 2, a longitudinal-vertical section of the pipe; Fig. 3, a cross section showing a modified arrangement of the joints; and Fig. 4, a cross section showing a modified form of the pipe.

Similar numerals refer to similar parts throughout the drawings.

The upper and lower sections 1 and 1ª, are shaped in semi-circular form by rolling or stamping, and are preferably provided with the annular corrugations 2. The edge portions 3 and 3ª of each section are each formed longitudinally flat, and the flat portion of one opposing edge, preferably of the lower section, is made wider than the other edge, and is folded twice upon itself to form the longitudinal groove 4 which is preferably tapered in its depth, in which groove the flat or tongue edge of the other section is adapted to be entered and wedged. The free edges 5 of the grooves are preferably turned slightly inward, so that when the tongue edges are entered therein, they will be clamped by the spring of the inturned edges, over the shoulders 5ª formed at the base of the opposing edges.

One corrugation of the end edge 6 of one section is preferably lapped over a corresponding corrugation on the end edge 6ª of the longitudinally adjoining section, and to permit such overlapping, the corresponding ends of the edge portions are cut away as at 7 and 7ª. It is not essential that the portion 7 of the plain or tongue edges shall be cut away for the reason that such portions of these edges can overlap each other in the grooves of the opposing section, but it is preferred to cut away the overlapping portions of these edges so that a single thickness only thereof will be entered in the opposing grooves at the end joints.

In the modified arrangement of the joints shown in Fig. 3, each opposing section is provided with a tongue on one side edge and a groove on the other, which arrangement may be preferred for the reason that all the sections are thus formed substantially alike and can be interchanged; and in the modified form of pipe shown in Fig. 4, the upper section only is corrugated and includes a greater portion of the circumference than the lower section, which latter is formed longitudinally flat.

It is evident that the sections of a pipe made as herein set forth can be readily assembled by merely entering the side edge tongues of one section into the side edge grooves of the opposing section with the end edges overlapping, and that the tongue will be sufficiently wedged or clamped in the groove to secure the section in proper position while the pipe is being formed; and that after the pipe is formed and covered, the weight of the cover prevents the tongues from being withdrawn from the grooves, thereby making a permanently tight joint, which is thus accomplished without the use of bolts or other separate fastening means. It is evident that it is not essential to flatten the side edges before shaping the one to form a groove for the other tongue-edge, but it is preferred to do so for the tongue-edge is thereby more readily entered into the groove edge, and makes a better fit therein.

What I claim as my invention, and desire to secure by Letters Patent, is—

1. A sheet-metal pipe including a series of sections having one of each opposing side edges twice folded to form a wedge groove in which the other one is entered.

2. A transversely-curved and annularly-corrugated pipe section having one side edge flattened and twice folded to form a wedge groove and the other flattened to form a tongue.

3. A transversely-curved annularly-corrugated pipe section having one side edge flattened and shaped to form a wedge groove and the other flattened to form a tongue.

4. A transversely-curved annularly-corrugated sheet-metal pipe section having its side edges flattened and one side edge twice folded on itself to form a clamping groove.

5. A transversely-curved annularly-corrugated sheet-metal pipe section having its side edges flattened and one side edge twice folded on itself to form a wedge groove.

6. A transversely-curved annularly-corrugated sheet-metal pipe section having its side edges flattened and one side edge shaped to form a clamping groove.

7. A transversely-curved annularly-corrugated sheet-metal pipe section having its side edges flattened and one side edge shaped to form a wedge groove.

8. A transversely-curved sheet-metal pipe section having one side edge twice folded to form a wedge groove.

WILLIAM N. KLOTZ.

Witnesses:
 DAVID B. SMITH,
 HARRY FREASE.

---

Copies of this patent may be obtained for five cents each, by addressing the "Commissioner of Patents, Washington, D. C."